United States Patent
Lee et al.

[11] Patent Number: 5,987,204
[45] Date of Patent: Nov. 16, 1999

[54] CABLE WITH PREDETERMINED DISCRETE CONNECTORIZATION LOCATIONS

[75] Inventors: Nicholas A. Lee, Woodbury; Gordon D. Henson, Lake Elmo; Michael A. Meis, Maplewood, all of Minn.

[73] Assignee: 3M Innnvative Properties Company, St. Paul, Minn.

[21] Appl. No.: 08/949,364

[22] Filed: Oct. 14, 1997

[51] Int. Cl.⁶ .............................. G02B 6/44; H01B 7/00
[52] U.S. Cl. ...................... 385/100; 385/114; 174/117 F
[58] Field of Search ................................. 385/100, 114; 174/117 F, 102 R

[56] References Cited

U.S. PATENT DOCUMENTS

| | | | |
|---|---|---|---|
| 4,680,573 | 7/1987 | Ciordinik et al. | 340/541 |
| 4,828,352 | 5/1989 | Kraft | 350/96.23 |
| 4,978,943 | 12/1990 | Mainiero et al. | 340/566 |
| 4,993,147 | 2/1991 | Carpenter et al. | 29/825 |
| 5,008,490 | 4/1991 | Straus et al. | 174/36 |
| 5,212,348 | 5/1993 | Gibson | 174/74 R |
| 5,360,944 | 11/1994 | Springer et al. | 174/117 F |
| 5,717,805 | 2/1998 | Stulpin | 385/114 |
| 5,737,470 | 4/1998 | Nagano et al. | 385/114 |
| 5,809,194 | 9/1998 | Lovie | 385/104 |

FOREIGN PATENT DOCUMENTS

| | | | |
|---|---|---|---|
| 0 696 034 A1 | 2/1996 | European Pat. Off. | H01B 7/08 |
| 3840353 A1 | 6/1990 | Germany | G02B 6/44 |
| 59-010904 | 1/1984 | Japan | G02B 5/16 |

*Primary Examiner*—John D. Lee
*Assistant Examiner*—Victoria D. Hao
*Attorney, Agent, or Firm*—Nestor F. Ho

[57] ABSTRACT

A cable assembly having predetermined discrete locations for subsequent connectorization is provided. The cable assembly of the present invention includes at least one conductor which may be an optical fiber or standard electrical wire conductor or any other type of conductor. The cable assembly also includes at least one layer of protective coating over the conductor. At least one prescored area is formed in the protective coating during the manufacturing process to provide for ease of connectorization in the field. Preferably, cable stripping is accomplished without the need for any tooling as a result of the prescored area formed in the protective coating.

20 Claims, 5 Drawing Sheets

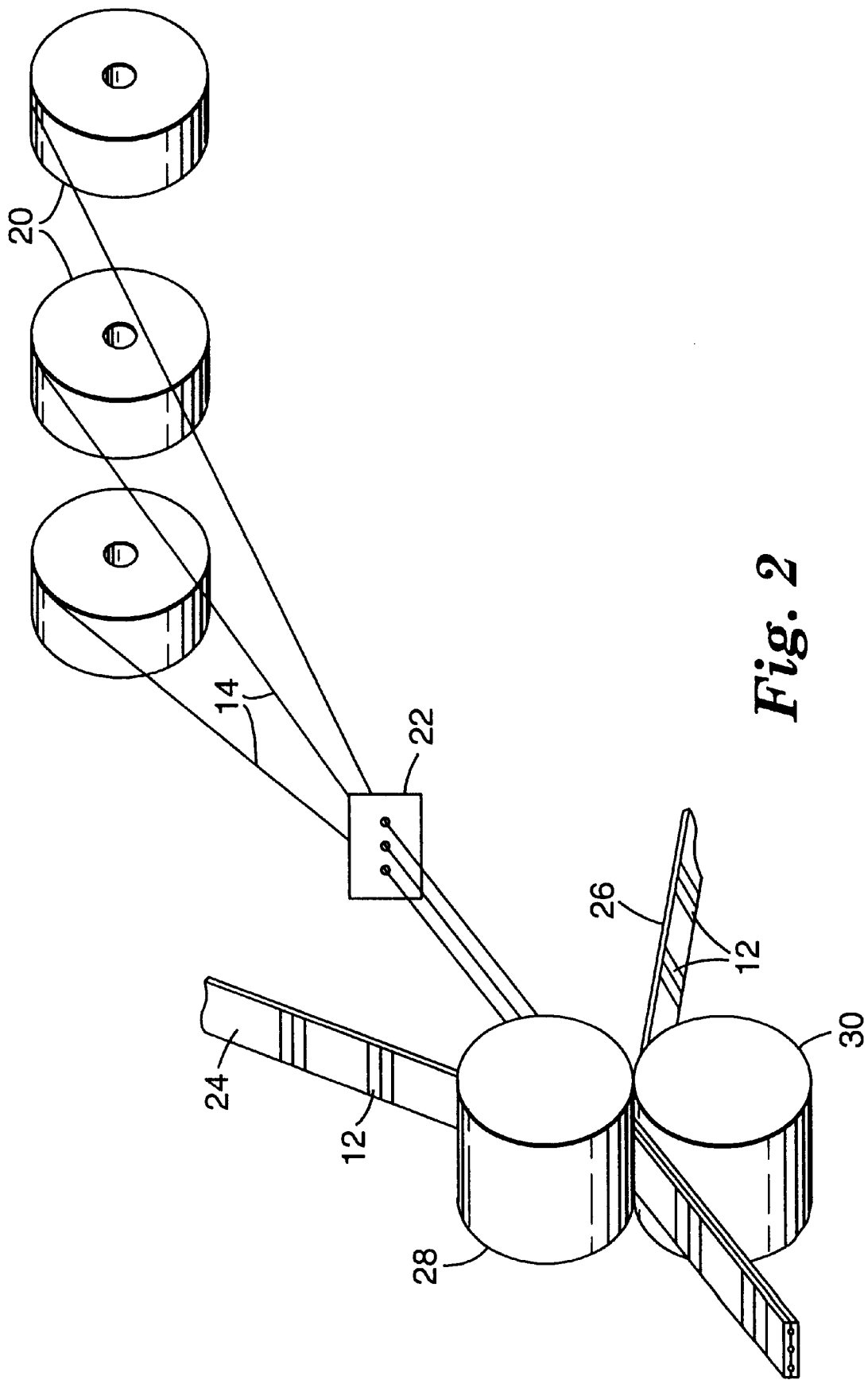

५,९८७,२०४

CABLE WITH PREDETERMINED DISCRETE CONNECTORIZATION LOCATIONS

RELATED APPLICATIONS

This application is related to U.S. Pat. No. 5,611,017, entitled FIBER OPTIC RIBBON CABLE WITH PRE-INSTALLED LOCATIONS FOR SUBSEQUENT CONNECTORIZATION.

FIELD OF THE INVENTION

The present invention relates generally to signal transmitting cables such as fiber optic cables or electrical cables. In particular, the present invention relates to a cable having predetermined-discrete connectorization locations incorporated into the cable during manufacturing.

BACKGROUND OF THE INVENTION

Multi-conductor cable media for transmitting electrical or optical signals are widely known and have come into extensive commercial use. Examples include fiber optic ribbon cables, coaxial cables, and electrically shielded electrical cables. All of the known cable media includes some form of insulation layer or protective layer surrounding the signal conductors. Inherent with the use of the known cable media comes the need for stripping off the protective coating to allow its signal conductors to be fitted for connectors.

Examples of electrical cables designed for at least one aspect of stripability are shown and described in U.S. Pat. No. 5,008,490 to Straus et al., U.S. Pat. No. 5,360,944 to Springer et al., and U.S. Pat. No. 5,212,348 to Gibson. The Straus et al., patent illustrates a strippable, shielded electrical cable having a plurality of elongated, parallel-spaced electrical conductors encased in a casing of electrical insulation. To strip the cable of the Straus invention, a tool is required to cut both lateral margins of the cable. The Springer et al., patent, which is assigned to the assignee of the present invention, discloses a high impedance cable that includes a first and second layer of insulation. The second layer of insulation may be stripped to expose the first layer with a conventional stripping tool. The Gibson patent discloses a partially stripped reinforced electrical signal cable. In the Gibson patent, a portion of the electrical conductors are exposed to the elements.

It would be desirable to provide a cable media capable of easy field connectorization while at the same time providing protection to the conductors. Currently, there are two primary multi-conductor connectors used in the fiber optic area. They are, AT&T's MAC Connector, and the MT Connector made by U.S. Conec. The MAC Connector made by AT&T is not designed to be field installable at all. The MT Connector can be field installed, but not simply. When a field technician desires to insert an MT Connector onto an existing cable, the technician must first cut the cable. The insulation jacket surrounding the cable is typically slit longitudinally to allow the insulation jacket to be peeled back. If the cable is cut too deeply at this point, the conductors could be scratched and damaged. Any strengthening members in the cable must then be peeled back. After peeling back the insulation jacket and any strengthening members that may be present, the technician is left with a fiber ribbon comprising a plastic ribbon coating encapsulating a series of conductors.

The tool used to strip the plastic ribbon coating from the conductors is usually a hot blade stripper. This tool heats up the entire end of the ribbon which is being stripped and then has two blades that come towards one another to cut the ribbon coating and pull the coating off of the fibers. This step often causes damage to the conductors because it is very easy to cut too deeply with the blades and therefore damage the conductors. Once the conductors are exposed and are cleaned with alcohol to remove any remaining coating residue or particles, the connector must be correctly filled with the appropriate amount of adhesive. The conductors are manually inserted through holes in the connector. Once this is done, the adhesive must be cured to secure the conductors in the connector.

It would be desirable to provide an improved cable assembly that allows for easy cable stripping to enhance field connectorization.

SUMMARY OF THE INVENTION

The present invention overcomes the drawbacks of the prior art by providing a cable assembly having predetermined-discrete locations for subsequent connectorization. The cable assembly of the present invention includes at least one conductor which may be an optical fiber or standard electrical wire conductor or any other type of conductor. The cable assembly also includes at least one layer of protective coating over the conductor. At least one prescored-area is formed in the protective coating during the manufacturing process to provide for ease of connectorization in the field. Preferably, cable stripping is accomplished without the need for any tooling as a result of the prescored-area formed in the protective coating.

The present invention also provides a method of manufacturing a cable assembly having predetermined discrete locations for subsequent connectorization. The method of the present invention includes the steps of providing a plurality of conductors oriented in a generally longitudinal orientation and having first and second ends. A protective coating is then applied over the conductors. A series of prescored-areas are then formed in the protective coating at discrete locations along the cable assembly.

BRIEF DESCRIPTION OF THE DRAWINGS

FIG. 2 illustrates a method of fabricating a cable assembly such as that shown in FIG. 1.

DETAILED DESCRIPTION OF THE PREFERRED EMBODIMENTS

Figure 1:
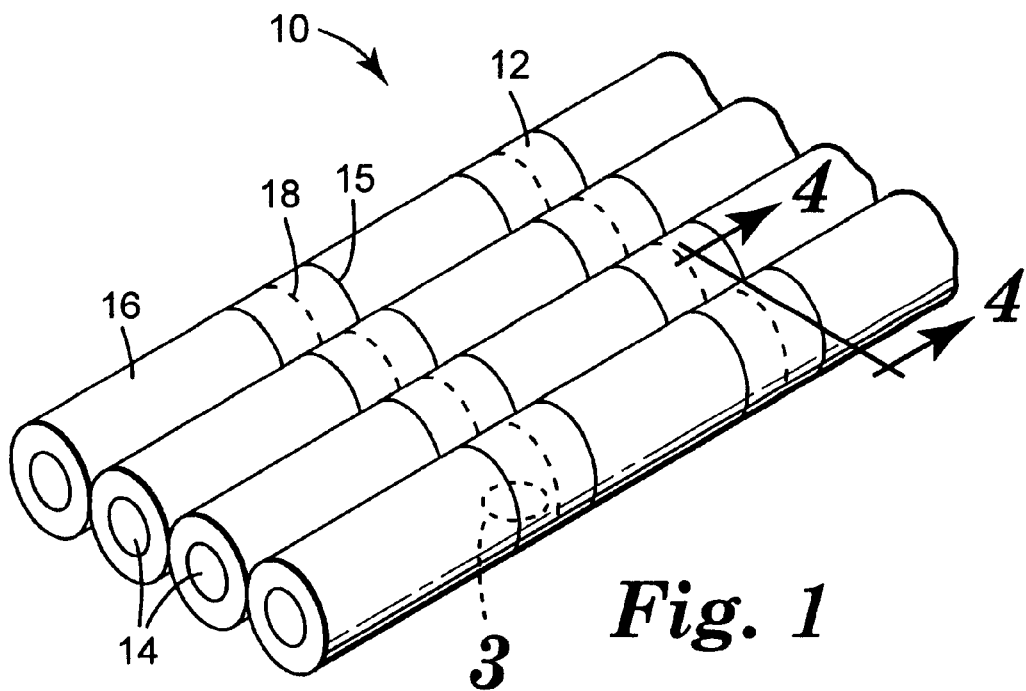
FIG. 1 is a perspective view of a cable assembly having predetermined discrete locations for subsequent connectorization according to the present invention.

The present invention may be understood in greater detail with specific reference to the figures. Referring to FIG. 1, a cable assembly 10 having predetermined discrete locations for subsequent connectorization 12 is illustrated. In the preferred embodiment of the present invention, cable assembly 10 is formed of a plurality of optical fibers for transmitting signals, however, it should be noted that the cable assembly of the present invention is equally applicable to electrical cables, coaxial cables or any other type of cable media. Cable assembly 10 has a single layer of conductors 14 covered by a protective element, or coating 16. In one embodiment of the present invention, coating 16 is extruded over conductors 14. The protective coating of the preferred embodiment is made of PVC, Teflon® (from E.I. Du Pont De Nemours & Co.), or TEFZEL® (also from Du Pont), however, other coatings may also be used without departing from the spirit or scope of the present invention. As protective coating 16 is extruded over conductors 14, pairs of scorings 15 are impressed into coating 16 and a center mark 18 is printed onto coating 16 midway between each pair of scorings, as illustrated in FIG. 1.

FIG. 2 illustrates an alternative method of fabricating a cable assembly. Instead of extruding coating 16 over conductors 14, an adhesive tape is applied over conductors 14. As illustrated in FIG. 2, at least one and preferably a plurality of conductors 14 are drawn from a corresponding series of spools 20 through a guiding comb 22. Guiding comb 22 is provided with structure to establish a fixed, lateral inter-conductor spacing between conductors 14. Preferably, this spacing corresponds with a fixed, lateral inter-conductor spacing of a connector assembly. After conductors 14 are brought through guiding comb 22 an upper adhesive tape 24 and a lower adhesive tape 26 are introduced to sandwich conductors 14 therebetween creating the cable assembly. Of course, it is to be understood that an equivalent structure may be obtained from a single adhesive tape which is folded around the conductors to form upper and lower portions. A pair of compression rollers 28 and 30 are preferably used to supply the force necessary to secure upper adhesive tape 24 to lower adhesive tape 26 with conductors 14 being held therebetween. As can also be seen, upper and lower adhesive tapes 24 and 26 already have prescored connectorization locations 12 formed thereon. Alternately, the prescored connectorization locations 12 could be applied to upper and lower tape layers 24 and 26 subsequent to the lamination of conductors 14 therebetween.

Figure 3:
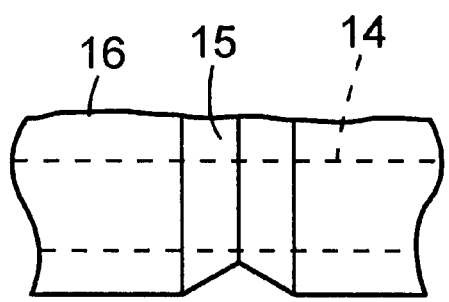
FIG. 3 is an enlarged top plan view of a prescored area of a cable assembly.

FIG. 3 is an enlarged top plan view of one of the prescored connectorization locations from FIG. 1. In FIG. 3, conductors 14 are illustrated in phantom in dash lines. As can be seen, protective coating 16 is scored at 15. The distance between center mark 18 and a scoring 15 may be, in one example, approximately 1–2 inches but could be larger or smaller depending on the specific needs or the connector needs.

Figure 4:
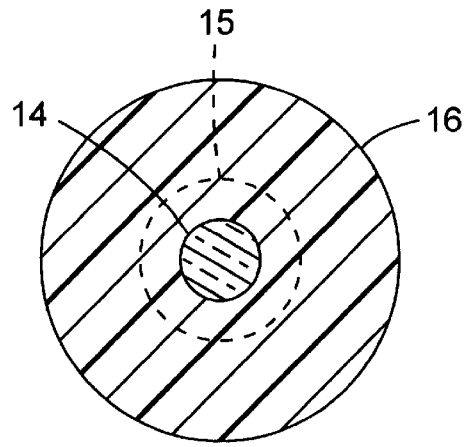
FIG. 4 is a cross sectional view taken along line 4—4 of FIG. 1.

FIG. 4 is a cross sectional view taken along line 4—4 from FIG. 1. FIG. 4 illustrates one preferred application wherein optical fibers, or conductors 14, are 125 microns thick while protective coating 16 is approximately 900 microns thick. The depth of score 15 may vary depending on a number of factors, but in the embodiment illustrated, protective coating 16 is scored approximately 350 microns deep. The scoring is illustrated in dashed lines in FIG. 4. Typically, the depth of the scoring is approximately ¾ of the thickness of the coating.

As stated above, there are a variety of factors that determine the depth of the score in the protective coating. They include the environment in which cable assembly 10 is to be used, the strength of the coating material and the brittleness or fracture resistance of the protective coating. If the environment in which the cable assembly is to be used is a very robust environment, the depth of the score should be less than if the environment is not as robust.

The predetermined discrete locations for the prescoring is variable depending on the application. For mass production, it may be desirable to have uniformity at a specific spacing distance, for example, a prescored connectorization location every six inches. Additionally, the prescored connectorization locations may be customized depending on customer needs. For example, a specific application may need connectorization locations only every ten feet.

Figure 5A:
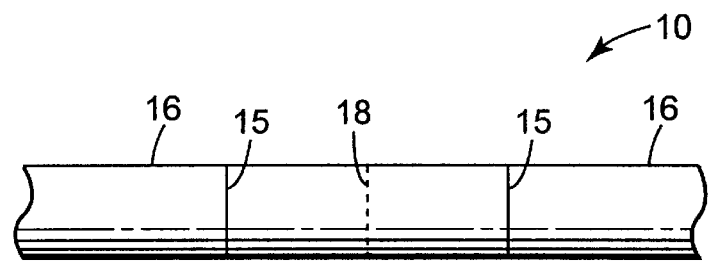
FIGS. 5A, B and C illustrate a method of stripping a cable assembly as in claim 1.
Figure 5B:
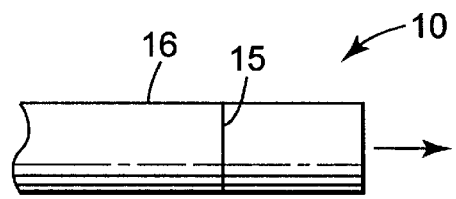
Figure 5C:
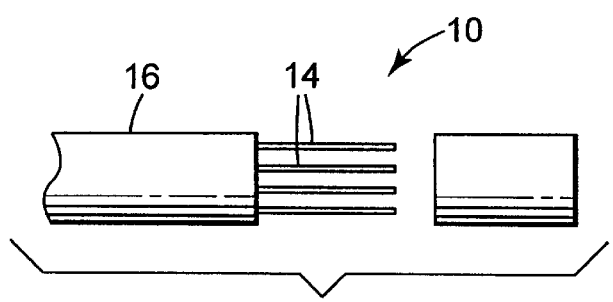

FIG. 5 illustrates a method of stripping a cable assembly such as cable assembly 10. To strip protective coating 16 from conductors 14 in cable assembly 10, the cable assembly is cut along center mark 18 as illustrated in FIG. 5A. A force is then applied to protective coating 16 between score 15 and the end of the cut cable as illustrated in FIG. 5B. In the preferred embodiment of the present invention, this force may be applied without the application of any special tools, for example simply by the hand of the operator. This force should be sufficient to cause protective coating 16 to break at score 15 and separate from cable assembly 10, thus exposing conductors 14 and rendering the cable ready for connectorization, as illustrated in FIG. 5C.

Figure 6:
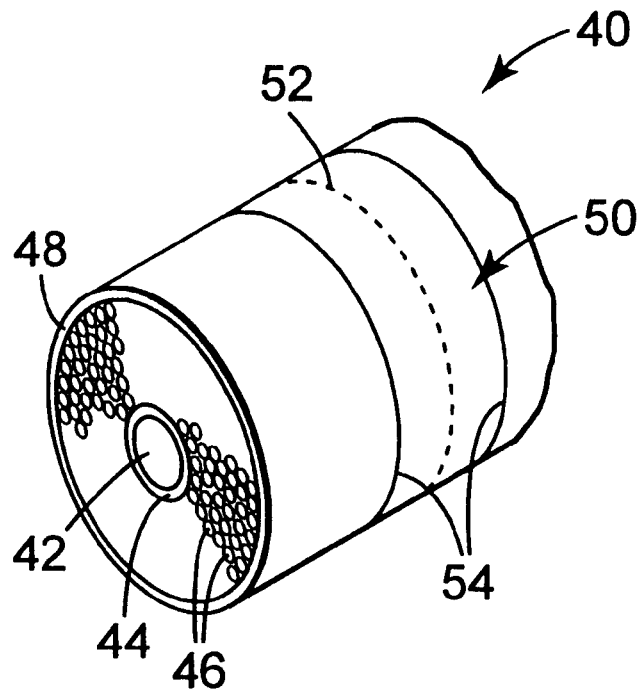
FIG. 6 is a perspective view of multi-layer cable construction having predetermined discrete locations for subsequent connectorization according to the present invention.

FIG. 6 illustrates an example of the present invention in a more complex, multi-layered cable construction 40. In the embodiment illustrated, cable construction 40 has a conductor 42 surrounded by an inner protective element 44. A plurality of fibrous strengthening elements 46 are provided about conductor 42 for strengthening assembly 40. Finally, a protective coating 48 is provided encompassing the entire assembly. As can be seen in FIG. 6, predetermined discrete locations for subsequent connectorization 50 are provided having a center line 52 and pair of scorings 54 impressed into outer coating 48. Inner coating 44 also has discrete locations for subsequent connectorization that cannot be seen in FIG. 6, but will be described in greater detail below.

Prescored area 50 from FIG. 6 is the same as the prescored location from FIG. 1. The depth of scores 54 may vary depending on a number of factors including the environment in which cable assembly 40 is to be used, the strength of the coating material and the brittleness and fracture resistance of the protecting coating.

Figure 7:
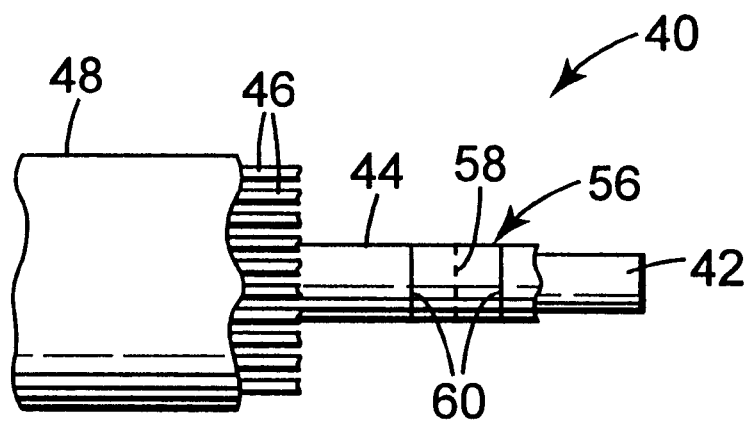
FIG. 7 is a plan view of the multi-layer cable of FIG. 6 with portions broken away.

FIG. 7 is plan view of multi-layer cable 40 with portions broken away. As can be seen in FIG. 7, beneath protective layer 48 and strengthening members 46 is conductor 42 having protective coating 44 formed thereabout. Protective coating 44 has predetermined discrete locations for subsequent connectorization 56 comprising a center line 58 and a pair of scorings 60.

Figure 8A:
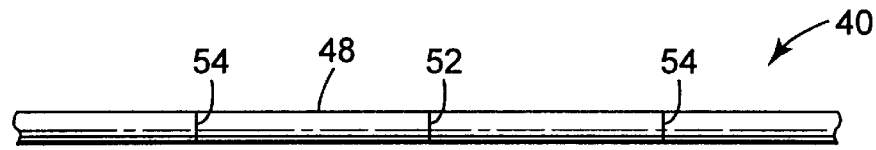
FIGS. 8 A, B, C, D and E illustrate a method of stripping a multi-layer cable construction.
Figure 8B:
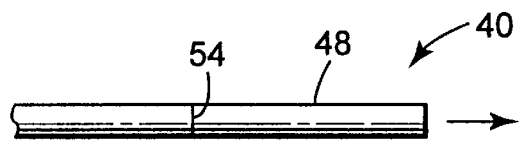
Figure 8C:
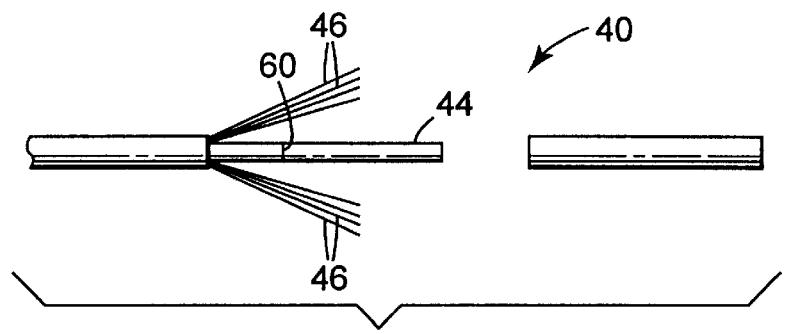
Figure 8D:
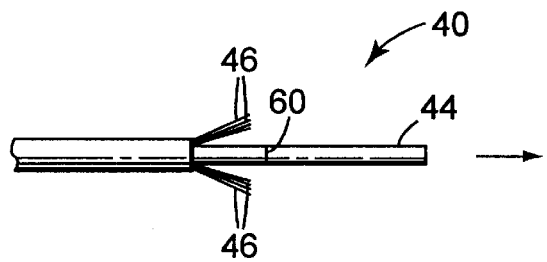

FIGS. 8A–E illustrate a method of stripping a multi-layer cable such as that illustrated in FIGS. 6 and 7. The method illustrated in FIGS. 8A–E is similar to that illustrated in FIGS. 5A–C. The first step is to cut through cable assembly 40 entirely at center line 52 as illustrated in FIG. 8A. The next step is to apply force to protective coating 48 between score 54 and the end of the cut cable as illustrated in FIG. 8B. Upon application of sufficient force, protective coating 48 should break at score 54 and separate from cable assembly 40, thus exposing strengthening members 46 and protective coating 44. The strengthening members are typically formed of Kevlar® from E. I. Du Pont De Nemours & Co., or other material having suitable strength to provide the necessary tensile strength for the cable assembly. The next step is to cut these strengthening members before exposing conductor 42. In this way, conductor 42 would be protected from any sort of tool used to cut the strengthening members.

In the method illustrated in FIGS. 8A–E, strengthening members 46 are cut before exposing conductor 42.

Figure 8E:
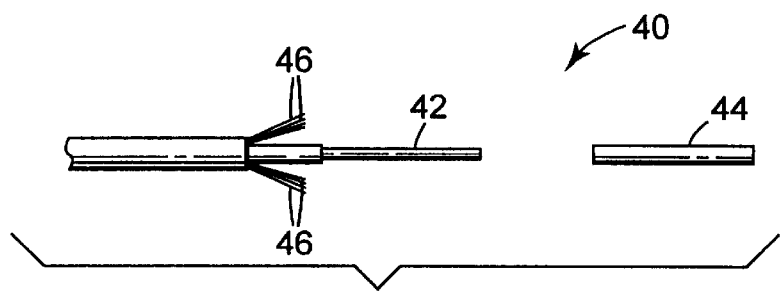

After strengthening members 46 have been cut, a force is then applied to protective coating 44 between score 60 and the end of cut conductor 42. As above, in the preferred embodiment of the present invention, this force may be applied without the application of specific tools, for example by the hand of the operator. This force should be sufficient to cause protective coating 44 to break at score 60 and separate from conductor 42, thus exposing conductor 42 and rendering the conductor ready for connectorization as illustrated in FIG. 8E.

The present application is equally applicable to numerous other cable assemblies such as that found in assignees previous U.S. Pat. No. 5,611,017, the disclosure of which is herein incorporated by reference.

As was stated above, it is desirable to score the protective coatings of the cable assemblies deep enough such that stripping may be accomplished without need for tools. However, if the environment that a cable assembly is to be used in is very robust, it may be desirable to not make the scorings as deep and to require a tool to aid in the stripping of the protective coating. In such a case, the tool would be used to increase the force applied until it was sufficient to cause protective coating 44 to break at score 60 and separate from conductor 42, thus exposing conductor 42 and rendering the conductor ready for connectorization as illustrated in FIG. 8E. Additionally, in order to ensure stripability, the protective coating must not be permanently bonded to the conductors. Ideally, the protective coating is releasably bonded to the conductor such that when the protective coating is broken at the scoring, the protective coating slides off of the conductor.

The invention is not to be taken as limited to all of the details thereof as modifications and variations thereof may be made without departing from the spirit or scope of the invention.

What is claimed:

1. A cable assembly having predetermined discrete locations for subsequent connectorization comprising:
   at least one conductor;
   a first layer of protective coating releasably bonded to the at last one conductor;
   at least one prescored area formed in the first layer of protective coating;
   a second layer of protective coating surrounding the conductor; and
   at least one prescored area formed in the second layer of protective coating.

2. The cable assembly of claim 1, wherein the least one prescored area formed in the first layer of protective coating is transversely prescored.

3. The cable assembly as in claim 1, wherein the at least one conductor is an optical fiber.

4. The cable assembly as in claim 1, wherein the first layer of protective coating is selected from the group consisting: PVC, Teflon® and TEFZEL®.

5. The cable assembly as in claim 1, wherein the first layer of protective coating is tool-lessly strippable at the first prescored area.

6. The cable assembly as in claim 1, wherein the at least one prescored area is scored to a depth of at least ¾ the thickness of the first layer protective coating.

7. The cable assembly as in claim 1, further comprising at least one strengthening member beneath the first layer of protective coating.

8. The cable assembly of claim 7, whereby the at least one strengthing member is between the first layer of protective coating and the second layer of protective coating.

9. A method of manufacturing a cable assembly having predetermined discrete locations for subsequent connectorization, the method including the steps of:
   (a) providing at least one conductor oriented in a generally longitudinal orientation;
   (b) applying a first layer of protective coating over the at least one contuctor;
   (c) transversely prescoring the first layer of protective coating at at least one discrete location along the cable assembly forming a prescored area;
   (d) applying a second layer of protective coating over the first layer of protective coating; and
   (e) prescoring the second layer at at least one location.

10. The method of claim 9, further comprising the step of providing a cut location, the cut location being longitudinally spaced apart from the prescored area.

11. The method of claim 10, wherein the step of tranversely prescoring the first layer comprises scoring the first layer at a first prescore area and at a second prescore area, wherein the cut location is located between the first and the second prescore areas.

12. The method of claim 9, wherein the step of transversely prescoring comprises circumferentially prescoring the first layer of protective coating.

13. A method of stripping a cable assembly having at least one conductor, a first layer and a second layer of protective coating over the at least one conductor, a first transversely prescored area formed in the first layer of protective coating and a second prescored area formed on the second layer, the method comprising the steps of:
   cutting the cable assembly;
   applying a force to the cut assembly in the first prescored area;
   breaking the protective coating at the first prescored area; and
   removing the broken portion of the protective coating from the conductor;
   applying a force to the cut assembly in the second prescored area;
   breaking the protective coating at the second prescored area; and
   removing the broken portion of the second layer of protective coating from the conductor.

14. The method as in claim 13, wherein the step of applying a force to the cut assembly is done tool-lessly.

15. The method of claim 13, wherein the step of cutting the cable assembly, comprises cutting the cable assembly at a cut point spaced apart a predetermined longitudinal distance from the prescored area.

16. The method of claim 15, wherein the cable assembly further comprises a second prescored area, and the cut point is located between the first and the second prescored area.

17. A cable assembly having predetermind discrete locations for subsequent connectorization comprising:
   at least one conductor;
   a first layer of protective coating releasably bonded to the at least one conductor; and
   at least one first transversely prescored area formed in the first layer of protective coating;
   further comprising a second layer of protective coating surrounding the conductor; and at least one second prescored area formed in the second layer of protective coating.

18. The cable assembly of claim 17, further comprising a cut location, the cut location being longitudinally spaced from the first transversely prescored area by a predetermined distance.

19. The cable assembly of claim 18, wherein the at least one transversely prescored area includes a first scored area and a second scored area, and the cut location is located between the first scored area and the second scored area.

20. The cable assembly of claim 17, wherein the first transversely prescored area is circumferentially prescored.

* * * * *